United States Patent
Thompson et al.

(10) Patent No.: US 6,250,897 B1
(45) Date of Patent: Jun. 26, 2001

(54) INTEGRAL BALL BEARING TURBOCHARGER ROTOR ASSEMBLY

(75) Inventors: Glenn F. Thompson, Palos Verdes Estates, CA (US); Robert J. McMullen, Lombard, IL (US)

(73) Assignee: AlliedSignal Inc., Morristown, NJ (US)

( * ) Notice: Subject to any disclaimer, the term of this patent is extended or adjusted under 35 U.S.C. 154(b) by 0 days.

(21) Appl. No.: 09/407,577

(22) Filed: Sep. 28, 1999

Related U.S. Application Data

(60) Provisional application No. 60/103,029, filed on Oct. 5, 1998.

(51) Int. Cl.[7] ................................................. F04B 17/00
(52) U.S. Cl. ......................... 417/407; 384/287; 384/906; 184/6.11
(58) Field of Search .......................... 417/407; 384/287, 384/906, 99; 184/6.11

(56) References Cited

U.S. PATENT DOCUMENTS

| | | | |
|---|---|---|---|
| 3,043,636 | * 7/1962 | Macinnes et al. | ................... 384/287 |
| 3,993,370 | * 11/1976 | Woollenweber | ..................... 417/407 |
| 4,460,284 | 7/1984 | Lauterbach et al. | . |
| 4,641,977 | 2/1987 | Woollenweber | . |
| 4,808,091 | 2/1989 | Ruetz | . |
| 4,944,660 | * 7/1990 | Joco | ..................... 417/407 |
| 5,076,766 | * 12/1991 | Gutknecht | ............................ 417/407 |
| 5,145,334 | * 9/1992 | Gutknecht | ............................ 417/407 |
| 6,032,466 | 3/2000 | Woollenweber et al. | . |

FOREIGN PATENT DOCUMENTS

| | | |
|---|---|---|
| 0339601 | 11/1989 | (EP) . |
| 2126663 | * 3/1984 | (GB) ................................... 417/407 |

* cited by examiner

Primary Examiner—Thomas Denion
Assistant Examiner—Thai-Ba Trieu
(74) Attorney, Agent, or Firm—Felix L. Fischer

(57) ABSTRACT

A combination bearing supporting a shaft interconnecting the turbine and compressor wheels of a turbocharger incorporates a rotating journal bearing, a squeeze film damper with a registration and retention flange, and a ball bearing assembly. The ball bearing assembly has an outer race providing a thrust shoulder and a registration receiver for the damper flange. Ball roller elements are retained by the outer race and engaged between the thrust shoulder on the outer race and an opposing thrust shoulder on the shaft.

3 Claims, 1 Drawing Sheet

INTEGRAL BALL BEARING TURBOCHARGER ROTOR ASSEMBLY

CROSS REFERENCE TO RELATED APPLICATIONS

This application claims the priority of copending application Ser. No. 60/103,029 filed on Oct. 5, 1998 having the same title as the present application.

FIELD OF THE INVENTION

This invention relates generally to the field of turbochargers and, more particularly, to a bearing rotor assembly used to support a rotating shaft within a turbocharger.

BACKGROUND OF THE INVENTION

Turbochargers for gasoline and diesel internal combustion engines are known devices used in the art for pressurizing or boosting the intake air stream, routed to a combustion chamber of the engine, by using the heat and volumetric flow of exhaust gas exiting the engine. Specifically, the exhaust gas exiting the engine is routed into a turbine housing of a turbocharger in a manner that causes an exhaust gas-driven turbine to spin within the housing. The exhaust gas-driven turbine is mounted onto one end of a shaft that is common to a radial air compressor mounted onto an opposite end of the shaft. Thus, rotation of the turbine also causes the air compressor to spin within a compressor housing of the turbocharger that is separate from the exhaust housing. The spinning of the air compressor causes intake air to enter the compressor housing and be pressurized or boosted a desired amount before it is mixed with fuel and combusted within the engine combustion chamber.

The common shaft extending between the turbine and compressor is disposed through a turbocharger center housing that includes a bearing assembly for: (1) facilitating shaft rotation; (2) controlling axially directed shaft thrust effects and radially directed shaft vibrations; and (3) providing necessary lubrication to the rotating shaft to minimize friction effects and related wear. The common shaft as used in turbocharger applications is known to have shaft-rotating speeds on the order of 60,000 to 80,000 rpm. Under such operating conditions it is imperative that the bearing assembly provide sufficient lubrication to the shaft to minimize the extreme friction effects that take place at such high rotating speeds, thereby extending shaft service life.

Bearing assemblies known in the art for turbocharger shaft applications include roller bearings and ball bearings to accommodate the high-speed shaft rotation. However, it has been found that bearing assemblies that make exclusive use of such ball or roller bearings do not provide a desired service life for turbochargers in vehicle applications. Other bearing assemblies known in the art for turbocharger applications make use of sleeve bearings. However, sleeve bearings have been found to be objectionable in such applications because their design do not tolerate a practical degree of shaft imbalance and do not operate to dampen resonant vibrations caused by such imbalance, such imbalance being a characteristic of rotating turbocharger shafts. Further, the inability of such sleeve bearings to accommodate shaft imbalance at such high speeds is known to cause oil film breakdown and metal-to-metal contact, also reducing the shaft operating life.

In an effort to address the disadvantages of these prior art bearing systems, bearing assemblies have been constructed in the form of a free-floating bushing, positioned between the rotating shaft and a stationary housing cavity, that include a roller or ball bearing system. The use of a roller or ball bearing system in conjunction with the free-floating bushing is designed to both provide a desired degree of lubrication to the shaft and to absorb vibration caused by the shaft during rotating movement at such high speeds. Such bearing systems also employ thrust-bearing surfaces to control axial shaft movement during rotary operation.

For example, U.S. Pat. No. 4,641,977 discloses a bearing system comprising an anti-friction rolling bearing that cooperates with a full-floating sleeve to carry the rotating turbocharger shaft. More specifically, the bearing system comprises an outer race having an integral one-piece elongated cylindrical outer bearing surface that is adapted to be carried rotatably on a film of lubricant at its interface with the turbocharger housing. The outer race cooperates with a full-floating sleeve at one of its ends and with the roller bearing at an opposite end. The roller bearing is interposed between the outer race and an inner race that is positioned concentrically around the shaft diameter. An end of the outer race adjacent the rolling bearing includes outwardly projecting surfaces that form thrust bearings stationary machine element. The shaft rotates within the assembly between the roller bearing and the full-floating sleeve.

While the above-discussed bearing system is known to meet the extreme lubrication and damping demands required in turbocharger shaft applications, its design and construction does not lend itself to cost effective production and assembly. Turbochargers for vehicle applications are produced using methods of high-volume manufacturing, thereby requiring that the turbocharger components be constructed in a manner that is consistent with high-efficiency assembly and robotic handling processes.

It is, therefore, desirable that a bearing assembly for use in a turbocharger be constructed in a manner that: (1) meets the lubrication requirements of a rotating turbine shaft under operating conditions; (2) provides necessary damping to a vibrating turbine shaft during operation; (3) provides thrust surfaces to control turbine shaft axial movement during rotary operation; and (4) is constructed in a manner facilitating high-volume manufacturing methods.

SUMMARY OF THE INVENTION

An integral ball bearing rotor assembly, constructed according to principles of this invention for use with a turbocharger for internal combustion engines, comprises: (1) a rotating journal bearing disposed concentrically within a stationary turbocharger shaft housing bearing assembly cavity and disposed concentrically around a turbine shaft outside diameter; (2) a cylindrical squeeze film damper disposed within the cavity adjacent an end of the rotating journal bearing and disposed concentrically around the turbine shaft; (3) a combination ball bearing outer race/thrust bearing/film damper register element disposed within the cavity at an opposite end of the damper and around the turbine shaft; and (4) ball roller elements interposed between the combination ball bearing outer race element and the turbine shaft. The bearing assembly functions to lubricate the turbine shaft under operating conditions, dampen vibrations caused by the rotating turbine shaft, control axial movement of the turbine shaft during operation, and facilitate high-volume manufacturing methods.

Although bearing assemblies of this invention can be used with any type of high-speed machinery having a shaft that is rotated at high speeds, e.g., 60,000 to 80,000 rpm, they are especially well suited for application within turbochargers for use with internal combustion engines. When placed in turbocharger use, the bearing assembly is disposed within a turbocharger shaft housing around a common rotating shaft having one end attached to a turbine that is disposed within a turbocharger turbine housing, and an opposite end attached to a compressor that is disposed within a turbocharger compressor housing.

The details and features of the present invention will be more clearly understood with respect to the detailed description and the drawing that illustrates a cross-sectional side elevation of a turbocharger bearing assembly constructed according to principles of this invention.

BRIEF DESCRIPTION OF THE DRAWINGS

The details and features of the present invention will be more clearly understood with respect to the detailed description and the following drawings, wherein.

DETAILED DESCRIPTION OF THE INVENTION

Figure 1:
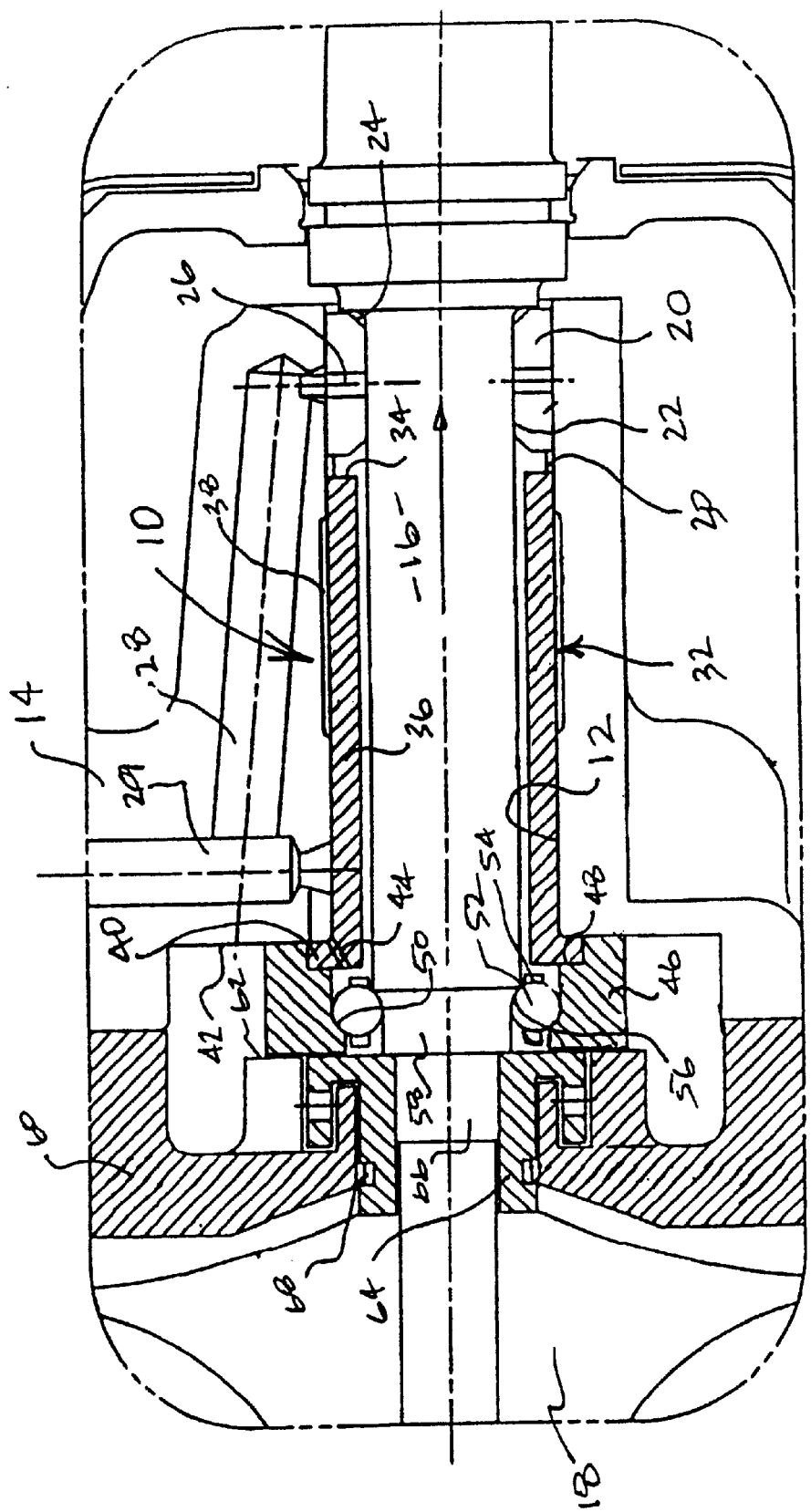
FIG. 1 illustrates a cross-sectional side elevation of a first embodiment turbocharger bearing assembly constructed according to principles of this invention.

Referring now to the drawing, an integral ball bearing rotor assembly 10 of this invention is disposed within a bearing assembly cavity 12 extending through a stationary turbocharger shaft or center housing 14. A common turbine/compressor shaft 16 is disposed within and extends axially through the cavity 12. A turbine (not shown) is attached to one end of the shaft 16 illustrated on the right-hand side of the drawing, and a compressor 18 is attached to an opposite end of the shaft 16 illustrated on the left-hand side of the drawing.

Moving leftwardly from the right-hand side of the drawing, the bearing assembly 10 comprises a turbine side dual film rotating journal bearing 20 disposed concentrically within the cavity 12 and concentrically around an outside shaft diameter 22. The rotating journal bearing can be made from those materials conventionally used in such applications. The rotating journal bearing 20 is in the form of an annular ring that is disposed within the cavity 12 adjacent the turbine side of the shaft 16. The journal bearing 20 includes axially directed surfaces 24 that taper inwardly moving towards the shaft 16 that are designed to minimize the contact surface area between adjacent axial journal bearing and axial shaft surfaces, thereby minimizing unwanted friction and wear effects between these adjacent surfaces.

The journal bearing 20 also includes one or more lubrication passages 26 that extend radially through the journal from the cavity 12 to the outside shaft diameter 22. The journal bearing lubrication passage 26 is positioned over and in fluid communication with an oil passageway 28 through the shaft housing 14 to facilitate the transport of lubricating oil to the rotating journal bearing and shaft and, more specifically, between both the adjacent cavity and rotating journal bearing surfaces, and between the adjacent rotating journal bearing and outside shaft diameter surfaces. Lubrication between the rotating journal bearing and cavity is desired, in addition to providing lubrication to the shaft, because the journal bearing is designed to rotate within the cavity.

Axial placement of the journal bearing 20 inwardly into the cavity 12 from a turbine end of the cavity is limited by ridge 30 (ring spaces) that projects radially inwardly into the cavity. The journal bearing has an outside diameter that is sized to facilitate its rotation within the cavity, and has an inside diameter that is sized to facilitate rotation of the outside shaft diameter therein.

An annular squeeze film damper 32 is disposed concentrically within the cavity 12 and is generally cylindrical in shape. The damper 32 extends axially through the cavity from an end 34 positioned adjacent the journal bearing 20 that abuts the ridge 30 towards a compressor end of the cavity. The damper 32 includes an axially extending wall section 36 having an outside diameter sized to facilitate its rotation within the cavity 12, and has an inside diameter sized larger than the journal bearing inside diameter to facilitate the passage of lubricant between the damper and outside shaft diameter 22 to form a vibration absorbing lubricant film therebetween during shaft rotation. The damper can be formed from materials conventionally used for such applications.

The cavity 12 includes an enlarged diameter section 38 that extends circumferentially around the damper wall 36. A further oil passageway 29 extends through shaft housing 14 to the cavity 12 for transporting lubricant to the damper wall outside surface. Both the cavity enlarged diameter section 38 and the oil passageway 29 are designed to provide lubricant to the damper wall outside diameter to reduce friction during rotation of the damper 32 within the cavity 12.

The damper 32 includes an outwardly turned end 40 at an end of the damper wall 36 opposite end 34 and adjacent the cavity compressor end. The damper end 40 projects radially outwardly to form a damper flange. The damper outwardly turned end or flange 40 includes an axially-facing surface that is positioned against a complementary cavity axially-facing surface 42 adjacent to the compressor 18 that is formed by a radially outwardly extending cavity wall. The damper flange 40 includes a plurality of lubricant passages 44 that extend therethrough from the cavity 12 to the outside shaft diameter 22 and, more specifically, to bearing elements as described below. Lubricant flows from the oil passageway 29 in the shaft housing 14, between the cavity and damper wall outside surface, through the lubricant passages 44 and to the rotating shaft 16 and bearing elements.

A combination bearing element outer race/thrust bearing/damper register 46 is independent from and is positioned adjacent the damper flange 40 along the cavity axially-facing surface 42. The combination outer race 46 can be formed from materials conventionally used to form bearing element outer races for use in such applications. The combination outer race 46 is shaped generally in the form of an annular ring having a notch 48 disposed circumferentially along an axial surface that faces the cavity axially-facing surface 42 to accommodate placement of the damper flange 40 therein. The combination outer race 46 has a generally cylindrical outside diameter surface and has an inside diameter surface having a shoulder 50 that is shaped to both accommodate placement of an outside diameter bearing element surface thereagainst and prevent axial displacement of the bearing elements towards the cavity compressor end. The combination outer race 46 is sized having an inside diameter that is larger than that of the damper 32 to accommodate placement of a plurality of bearing elements between the shaft and the combination outer race.

As mentioned above, a plurality of bearing elements 52 are interposed between the combination outer race 46 inside diameter and the shaft 16. The bearing elements 52 can be made of conventional materials known in the art for use in such applications, and are arranged together by a singlepiece bearing element retainer 54 to form an integral bearing element and retainer assembly. The bearing elements 52 are supported along an inside diameter surface by a shoulder 56 formed along a shaft first reduced diameter section 58 that is positioned concentrically within both the bearing elements 52 and combination outer race 46. Together, the combination outer race shoulder 50 and shaft shoulder 56 work to both contain the bearing elements 52 therebetween and control bearing element/shaft axial displacement within the cavity.

The combination outer race 46 is interposed axially between the cavity axially-facing surface 42 on one side and a compressor backplate 60 that is attached to the shaft housing 14. More specifically, the combination outer race is trapped axially between the cavity axially-facing surface 42 on one side and an axial surface 62 of the compressor backplate 60. The combination outer race 46 is free to rotate within the shaft housing. An oil seal ring gland 64 is interposed between the compressor backplate 60 and the combination outer race 46 and also acts to trap the combination outer race axially between the shaft housing and compressor backplate. The oil seal ring gland 64 is disposed concentrically around a shaft second reduced diameter section 66 and includes an annular sealing ring 68, disposed circumferentially around a gland outside diameter, that is interposed between adjacent gland compressor backplate surfaces to form a leak-tight seal therebetween.

A feature of the bearing assembly of this invention is the two-piece construction of the combination outer race element 46 and damper 32 that provides the desired finctions of accommodating thrust loads from both the bearing elements and the damper, and facilitates high-volume manufacturing. Specifically, the combination outer race 46 is designed to accommodate thrust loads and act as a thrust bearing for the bearing elements 52 and shaft 16 by its contact with the bearing elements along shoulder 50, thereby preventing shaft axial displacement in the compressor direction. The combination outer race 46 is also designed to accommodate thrust loads and act as a thrust bearing for the damper 32 by its registration with the damper flange 40 within the notch 48, thereby preventing damper axial displacement in the compressor direction. Another feature of the bearing assembly of this invention is the use of an integral bearing element and retainer assembly and use of the shaft itself as the bearing element inner race. Specifically, using an integral bearing element and retainer assembly facilitates assembly of the turbocharger by not having to load each of the bearing elements, e.g., bearing balls, individually, but rather permitting the bearing elements to be loaded in a single, time-saving step. Additionally, the design of forming a bearing element inner race as an integral shoulder of the shaft avoids the need to load a separate inner race onto the shaft during turbocharger assembly, thereby also expediting the manufacturing process.

During turbocharger operation, and rotary movement of the shaft, the integral ball bearing rotor assembly of this invention functions in the following manner. The rotating journal bearing 20 both directs lubricating oil to the shaft and carries the rotational movement of the shaft adjacent the turbine while rotating to a lessor extent within the cavity 12. The damper 32 functions to provide a thin film of lubricating oil between the cavity and damper outside diameter to lubricate rotational damper movement within the cavity. The damper also functions to route lubricating oil from the shaft housing to the bearing elements 52. The combination outer race 46 carries both the radial loads imposed by the bearing elements, and the axial loads that are imposed by the bearing elements from the shaft and by the damper to control shaft and damper axial movement within the shaft housing cavity.

Having now described the invention in detail as required by the patent statutes, those skilled in the art will recognize modifications and substitutions to the specific embodiments disclosed herein. Such modifications are within the scope and intent of the present invention as defined in the following claims.

What is claimed is:

1. A turbocharger for internal combustion engines comprising:
    a turbine housing;
    a compressor housing having a compressor backplate attached thereto;
    a shaft housing interposed between the turbine and compressor housing;
    a shaft extending through the shaft housing and comprising a turbine at one end extending into the turbine housing, and a compressor at an opposite shaft end extending into the compressor housing;
    a bearing assembly disposed within a cavity extending through the shaft housing comprising:
        an annular rotating journal bearing positioned concentrically around the shaft adjacent the turbine;
        an annular rotating squeeze film damper positioned concentrically around the shaft and adjacent an axial end of the rotating journal bearing, the damper including a radially outwardly projecting flange at an axial end opposite the rotating journal bearing;
        an annular combination outer bearing element race/thrust bearing disposed concentrically around the shaft and fixedly interposed axially between the damper flange and compressor backplate, the damper flange being contained within a circumferential notch in axial surface of the combination outer bearing element race/thrust bearing, the notch forming a thrust bearing surface for the damper flange; and
        a plurality of ball bearing elements interposed radially between the shaft and the combination outer bearing element race/thrust bearing, the combination outer bearing element race/thrust bearing having a center bore with a shoulder shaped to engage an outside surface of the bearing elements thereagainst, the shaft having a first section with a diameter sized to be received through the center bore of the combination outer bearing element race/thrust bearing and a second section with a shoulder shaped to engage an inside surface of the bearing elements thereagainst,
    the shoulder on the combination outer bearing element race/thrust bearing engaging the the plurality of bearing elements as an outer race and a reaction surface for thrust loads imposed by the shoulder of the shaft on the bearing elements and the notch providing a reaction surface for thrust loads imposed by the damper to control shaft and damper axial displacement within the shaft housing.

2. The turbocharger as recited in claim 1 wherein the plurality of bearing elements include a bearing element retainer that forms an integral bearing element assembly.

3. The turbocharger as recited in claim 1 wherein the rotating journal bearing and damper each include means for delivering lubricating oil from the shaft housing cavity to the shaft.

* * * * *